United States Patent
Kim et al.

(10) Patent No.: US 10,534,348 B2
(45) Date of Patent: Jan. 14, 2020

(54) CARBON FIBER REINFORCED PLASTIC MACHINING METHOD USING COMPUTER AIDED MACHINING PROGRAM

(71) Applicant: KOREA INSTITUTE OF INDUSTRIAL TECHNOLOGY, Cheonan-si, Chungcheongnam-do (KR)

(72) Inventors: Tae Gon Kim, Cheonan-si (KR); Seok Woo Lee, Seongnam-si (KR); Kyung Hee Park, Yongin-si (KR); Hyo Young Kim, Anseong-si (KR)

(73) Assignee: Korea Institute of Industrial Technology, Cheonan-si, Chungcheongnam-do (KR)

( * ) Notice: Subject to any disclaimer, the term of this patent is extended or adjusted under 35 U.S.C. 154(b) by 0 days.

(21) Appl. No.: 15/124,670

(22) PCT Filed: May 30, 2016

(86) PCT No.: PCT/KR2016/005720
§ 371 (c)(1),
(2) Date: Sep. 8, 2016

(87) PCT Pub. No.: WO2016/195356
PCT Pub. Date: Dec. 8, 2016

(65) Prior Publication Data
US 2018/0088557 A1    Mar. 29, 2018

(30) Foreign Application Priority Data
May 29, 2015    (KR) .......................... 10-2015-0076503

(51) Int. Cl.
*G05B 19/4097*    (2006.01)
*G05B 19/4099*    (2006.01)

(52) U.S. Cl.
CPC ..... *G05B 19/4097* (2013.01); *G05B 19/4099* (2013.01); *G05B 2219/35012* (2013.01); *G05B 2219/49108* (2013.01); *Y02P 90/265* (2015.11)

(58) Field of Classification Search
CPC .......................................... G05B 2219/49103
See application file for complete search history.

(56) References Cited

U.S. PATENT DOCUMENTS

| | | | | |
|---|---|---|---|---|
| 2008/0100251 A1* | 5/2008 | Xu | ...................... | G05B 19/4163 318/571 |
| 2012/0219371 A1* | 8/2012 | Craig | ........................ | B23C 3/02 408/1 R |

(Continued)

FOREIGN PATENT DOCUMENTS

| KR | 1000590660000 |     | 2/1993 |
|----|---------------|-----|--------|
| KR | 1007431520000 | B1  | 7/2007 |
| KR | 1014522150000 | B1  | 10/2014 |

*Primary Examiner* — Mohammad Ali
*Assistant Examiner* — Vincent W Chang
(74) *Attorney, Agent, or Firm* — Rabin & Berdo, P.C.

(57) ABSTRACT

Provided is a carbon fiber reinforced plastic machining method using CAM which includes the step (S10) of determining machining grade in accordance with a machining target and the step (S20) of determining machining grade in accordance with a machining process, in which the machining grade is a processing condition which is determined in accordance with the rotational speed and the feeding speed of a spindle as a machining tool.

4 Claims, 4 Drawing Sheets

(56) References Cited

U.S. PATENT DOCUMENTS

| | | | |
|---|---|---|---|
| 2013/0032227 A1* | 2/2013 | Murai | F15B 11/046 |
| | | | 137/544 |
| 2013/0189043 A1* | 7/2013 | Uchiuzo | G05B 19/4163 |
| | | | 408/1 R |
| 2016/0045961 A1* | 2/2016 | Umehara | B23B 35/00 |
| | | | 428/596 |

* cited by examiner

CARBON FIBER REINFORCED PLASTIC MACHINING METHOD USING COMPUTER AIDED MACHINING PROGRAM

CROSS-REFERENCE TO RELATED APPLICATION

This application is the U.S. National Phase of International Application No. PCT/KR2016/005720, filed May 30, 2016, which claims priority to and the benefit of Korean Patent Application No. 10-2015-0076503, filed on May 29, 2015. Any and all applications for which a foreign or domestic priority claim is identified here or in the Application Data Sheet as filed with the present application are hereby incorporated by reference in their entireties under 37 CFR 1.57.

BACKGROUND OF THE INVENTION

Field of the Invention

The present invention relates to carbon fiber reinforced plastic machining methods using a computer aided machining (CAM) program. More particularly, the present invention relates to a carbon fiber reinforced plastic machining method using embedded software developed to be matched to carbon fiber reinforced plastic materials.

Description of the Related Art

Carbon fiber reinforced composite materials have advantages in that, compared to other types of fibers, the physical properties such as specific strength, specific elasticity, and heat resistance are excellent and it is possible to provide high elasticity complex. In present, carbon fiber reinforced composite materials are often used in an aviation industry because of the specific properties of the material, such as specific rigidity, corrosion resistance, abrasion resistance, and high strength. Furthermore, their use in many areas such as sports goods, machinery constructions, and automobiles is gradually increased.

Such carbon fiber reinforced composite materials have a problem in that the performances in a thickness direction are deteriorated due to lamination manufacturing processes, and thus delamination and the like occur.

In present, in order to machine a workpiece of a complex shape, five-axis machining technique using three linear feeding axes and two rotary feeding axes is used. Since five-axis processing is complicated in the machining tool attitude control, the machining is performed using computer aided machining (CAM) S/W.

In addition, in order for the part connection or the functions of the workpiece itself in the mold machining of general products, there are often cases where building a hole with a relatively larger depth compared to the diameter occur.

However, in the CAM S/W currently in use, there are only several types that support the functions of machining grooves formed perpendicularly to the surface of a workpiece. Therefore, when using the CAM S/W currently in use, trial and error is necessarily accompanied.

In the patent registration No. 10-1491049 (drilling tool control system and drilling tool control method using the control system), in order to solve such problems described above, a drilling tool control system and a drilling tool control method using the control system by which even an unskilled person can easily machine a hole having a certain angle with respect to a curved or a flat surface are described. However, in the present situation, the program which is capable of the CAM specialized in the stack structure, the machining target, and the machining process, as well as controlling the process is not yet developed.

SUMMARY OF THE INVENTION

To solve the problems described above, the technical issue to be achieved by the present invention is to develop an embedded software suitable for the machining process of carbon fiber reinforced plastic and its combination, and to provide a carbon fiber reinforced plastic machining method using CAM which is capable of fulfilling carbon fiber reinforced plastic machining method using the embedded software described above.

This invention, originated in order to achieve the technical issues described above, in respect of a carbon fiber reinforced plastic machining method using CAM of claim 1, includes the step S10 of determining machining grade in accordance with a machining target and the step S20 of determining machining grade in accordance with a machining process and provides a carbon fiber reinforced plastic machining method using CAM which features a processing condition in which the machining grade described above is determined in accordance with the rotational speed and the feeding speed of a spindle as a machining tool.

Advantageous Effects of the Invention

According to an embodiment of the present invention, it is possible to increase the productivity by improving machining accuracy and machining quality at the time of machining carbon fiber reinforced plastics.

In addition, according to an embodiment of the present invention, it is possible to be configured so that CAM for setting tool routes and machining conditions suitable for the properties of heterogeneous composite materials can be matched.

Effects of the present invention are not intended to be limited to the effects described above. It should be understood that the effects of the present invention include all effects which can be inferred from the configuration of the invention described in the detailed description or the claims of the present invention

DETAILED DESCRIPTION OF THE PREFERRED EMBODIMENTS

Figure 1:
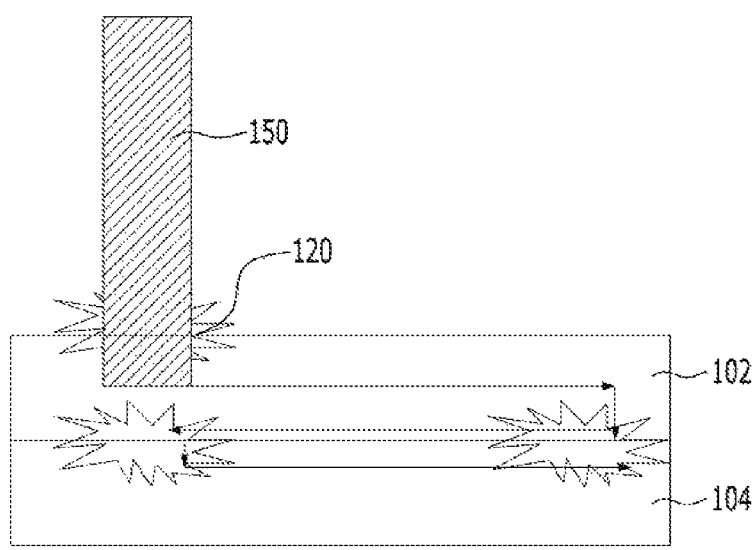
FIG. 1 is a schematic view illustrating a precision-machining-required part at the time of machining a composite material having a stack structure.

In order to achieve the technical issue described above, an embodiment of the present invention in respect of a carbon fiber reinforced plastic machining method using CAM, includes a step S10 of determining machining grade in accordance with a machining target and a step S20 of determining machining grade in accordance with a machining process and provides a machining method which includes a processing condition where the machining grade is determined in accordance with the rotational speed and the feeding speed of a spindle as a machining tool.

In a carbon fiber reinforced plastic machining device using CAM of an embodiment of the present invention, it is possible to provide a carbon fiber reinforced plastic machining device using CAM which includes embedded software controlling for each machining target and each machining process, a machining device which performs a drilling process, a milling process, or an orbital milling process in accordance with the control of the embedded software, and a controller which performs a machining process for each machining target in relation to individual machining target.

In the carbon fiber reinforced plastic composite material machining method using CAM of the embodiment of the present invention, it is possible to provide the carbon fiber reinforced plastic composite material machining method using CAM which includes a step (S110) of setting a machining route suitable for machining characteristics of the carbon fiber reinforced plastic composite material and a step (S120) of setting a machining condition matched with the machining route described above, and machining the carbon fiber reinforced plastic composite material based on the set information described above for each step.

In a carbon fiber reinforced plastic composite material machining device using embedded software of an embodiment of the present invention, the embedded software described above is a program including processing conditions reflecting material characteristics and processing conditions reflecting the machining target, and it is possible to provide the carbon fiber reinforced plastic composite material machining device using embedded software in which includes a spindle machining the carbon fiber reinforced plastic composite material based on the embedded software and a controller controlling the movement of the spindle described above.

Embodiments

Hereinafter, the present invention will be described with reference to the accompany drawings. However, the present invention may be embodied in various different forms; therefore, the present invention may not be limited to the embodiments described below. In addition, in order to clearly illustrate the present invention in the drawings, the parts not related to the description are omitted and similar reference letters and numerals are given to similar parts throughout the description.

In the description, when it is described that a part is "connected" to other part, this includes not only "direct connection" but also "indirect connection" interposing the other part. In addition, when it is described that a part "includes" another component, this does not mean "another component is excluded" but it means "another component can be further included" as long as there is no specific description to be opposite.

Hereinafter, embodiments of the present invention will be described in detail with reference to the accompany drawings.

FIG. 1 is a schematic view illustrating a precision-machining-required part at the time of machining a composite material having a stack structure.

Referring to FIG. 1, the composite material of a stack shape according to an embodiment of the present invention may include the first workpiece 102 and the second workpiece 104. For example, the first and second workpieces 102 and 104 may include carbon fiber reinforced plastics (CFRP).

More specifically, CFRP of different types may be included, for example, the first workpiece 102 including the first carbon fiber reinforced plastics and the second workpiece 104 including the second carbon fiber reinforced plastics. Or else, the first workpiece 102 may include the first carbon fiber reinforced plastics and the second workpiece 104 may include metals.

As illustrated in FIG. 1, deformation of materials may occur in a stack inlet portion, a boundary portion, and a stack outlet portion in accordance to the rotation and movement of a spindle 150 as a machining tool. Cracks 120 may occur in each portion depending on deformation of materials.

In order to minimize the occurrence of the cracks 120 which is the problem on such a machining process, the machining grade in relation to the stack structure can be changed. The terms "machining grade" may mean the processing condition at the time of machining with respect to carbon fiber reinforced plastics using CAM which is the embodiment of the present invention.

The processing conditions described above may be conditions in relation to the rotational speed (rpm) and the feeding speed (feed) of the spindle 150. The high grade machining may be machining of the type that the rotational speed (rpm) is increased and the feeding speed (feed) is reduced. In contrast, the low grade machining may be machining of the type that the rotational speed (rpm) and the feeding speed are increased.

The high grade machining can be applied to the stack inlet portion, the stack outlet portion, and the boundary portion of the stack structure. In contrast, the low grade machining may be machining applied to the stack body portion.

Even in a case of no stack structure, in other words, a single-layered structure, such a high grade machining can be performed in such a manner that conditions in relation to the machining inlet portion, the machining outlet portion, and the body portion differ from one another. In a case of composite materials in which stacks are layered on one another, the machining route can be set to be matched to the thickness of each stack.

The step of determining the machining grade in accordance to the stack structure described above may be a step in which the feeding speed is reduced in the stack inlet portion, the stack outlet portion, and the boundary portion and the rotational speed is increased.

In the machining process on the composite materials 102 and 104 of the stack shape of the embodiment of the invention, the high grade machining and the low grade machining can be automatically performed in combination in accordance with the predetermined program. The predetermined program described above may be the embedded software embedded in a controller.

The carbon fiber reinforced plastic stack machining device configured to be able to be matched to CAM, the device being according to the embodiment of the present invention, is configured so that the embedded software can be controlled by reflecting the condition of such a stack structure. The device of embodiment of the present invention can be designed so that, even in a case of, non-stack structure, a single-layered structure, the device is automatically controlled by the embedded software.

Referring to FIG. 1, machining accuracy, machining quality, and productivity can be improved by inducing the change of the processing conditions on the stack structure including the stack inlet portion, the stack outlet portion, the body portion, and the boundary portion.

Figure 2:
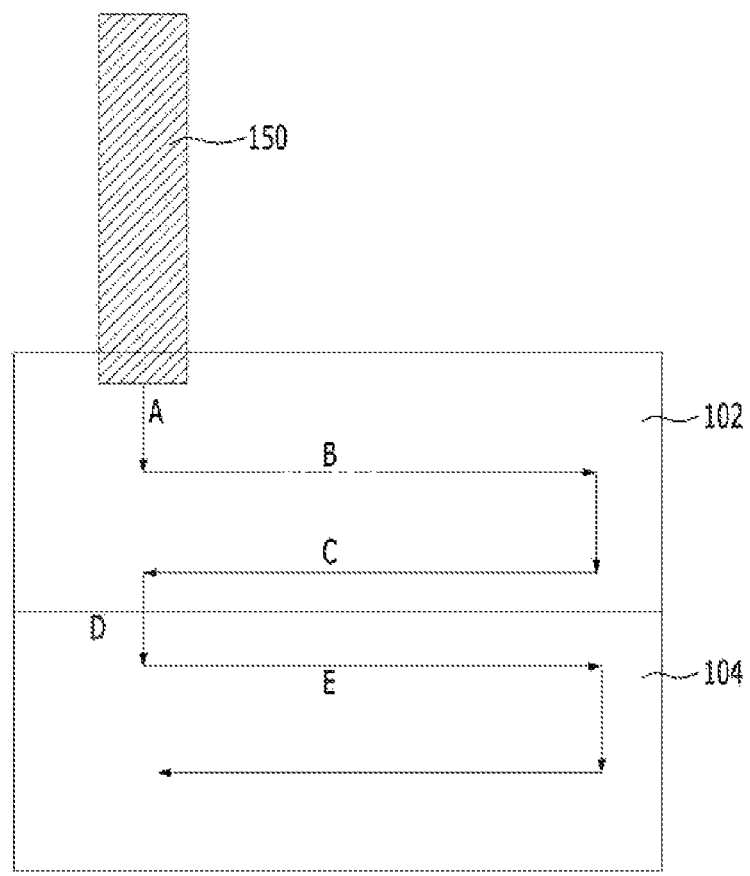
FIG. 2 is a view illustrating the performance of processing in accordance with the stack structure according to an embodiment of the present invention.

FIG. 2 is a view illustrating the performance of processing in accordance with the stack structure according to the embodiment of the present invention.

Referring to FIG. 2, a portion A is the stack inlet portion, and thus it may be necessary to be subjected to high grade machining. The high grade machining described above may be machining that the feeding speed is reduced and the rotational (rpm) speed is increased.

A portion B is the body portion and may be subjected to high speed machining that the feeding speed (feed) and the rotational speed are increased. In this case, when the material of the body portion is carbon fiber reinforced plastic, the feeding speed (feed) and the rotational speed (rpm) can be changed in accordance with the directivity of the carbon fiber reinforced plastic or the material of the carbon fibers contained therein.

In this case, the feeding speed (feed) and the rotational speed (rpm) can be changed in accordance with the materials of the first workpiece 102 and the second workpiece 104, the materials being an individual processing condition.

The carbon fiber reinforced plastic machining device using CAM of an embodiment of the present invention may include embedded software controlling for each machining target and each machining process, a machining device which performs a drilling process, a milling process, or an orbital milling process in accordance with the control of the embedded software, and a controller which performs a machining process for each machining target in relation to individual machining target.

The carbon fiber reinforced plastic machining device using CAM of the embodiment of the present invention may include a suitable process reflecting material properties in accordance with physical properties of carbon fiber reinforced plastic materials.

Figure 3:
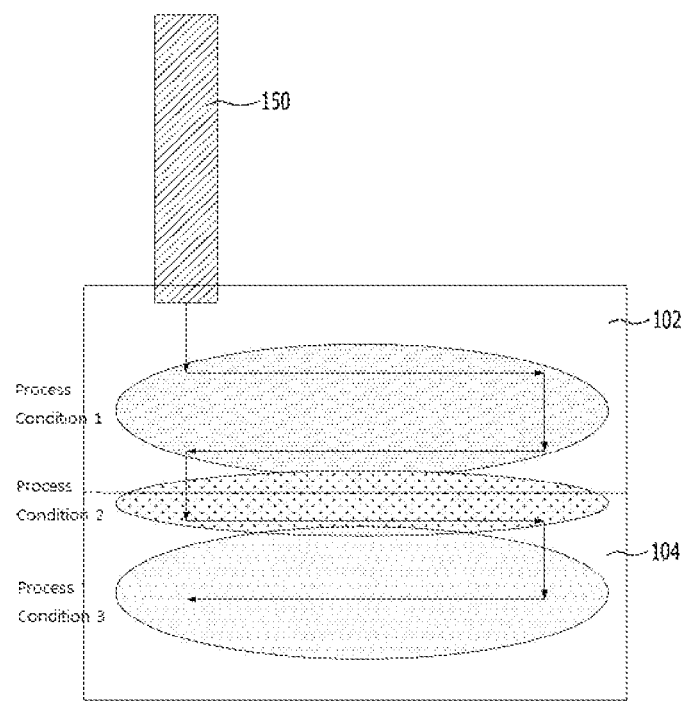
FIG. 3 is a view illustrating the performance of processing in accordance with a machining target according to an embodiment of the present invention.

FIG. 3 is a view illustrating the performance of processing in accordance with a machining target according to the embodiment of the present invention.

Referring to FIG. 3, the carbon fiber reinforced plastic stack of the stack shape may include the first workpiece 102 and the second workpiece 104.

The first workpiece 102 and the second workpiece 104 described above may be the combination of the first carbon fiber reinforced plastic and the second carbon fiber reinforced plastic or the combination of the first carbon fiber reinforced plastic and metal individually.

In FIG. 3, processing condition 1 may be a machining condition suitable for material properties of carbon fiber reinforced plastics. In addition, processing condition 2 may be a machining condition reflecting the properties of epoxy resins of the boundary portion. Furthermore, processing condition 3 may be a machining condition suitable for material properties of metals. Since, carbon fiber reinforced plastics and metals greatly differ in toughness, strength, and the like, the hole machining process can be performed by changing the processing condition in accordance with machining materials. In FIG. 3, when the second carbon fiber reinforced plastic is formed of the workpiece 104, the first processing condition can be performed again.

When the processing conditions in accordance with the machining targets are differently set as described above, the machining accuracy and the machining quality can be improved.

FIGS. 4A to 4C are views illustrating the performance of processing in accordance with machining processes of the embodiment of the present invention.

Figure 4:
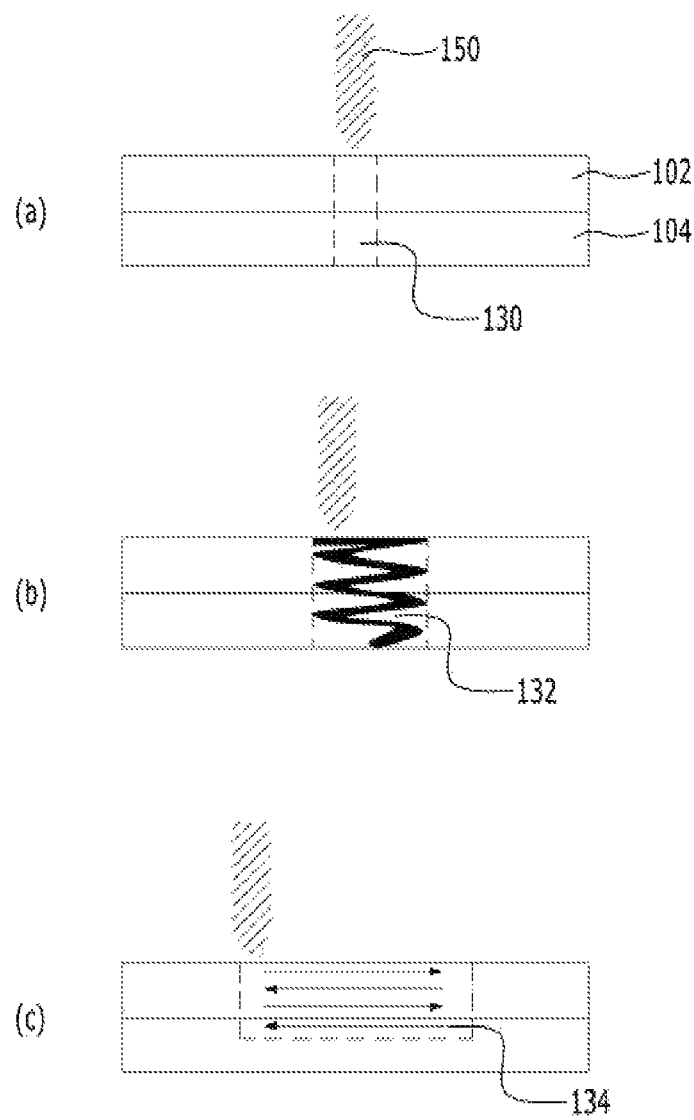
FIGS. 4A to 4C are views illustrating the performance of processing in accordance with machining processes of an embodiment of the present invention.

Referring to FIG. 4, the machining process can perform drilling, milling, and orbital milling.

Drilling may be a machining process that the spindle 150 rotates about the main axis thereof and progresses in a vertical direction. When the drilling process is performed, a relatively narrow machined hole 130 can be formed.

One of drilling, milling, and orbital milling can be selected and performed machining in accordance with carbon fiber reinforced plastics or metallic materials of the machining target.

The milling process may be a machining process that the spindle 150 as the machining tool rotates and progresses in left and right directions. When the milling process is performed, a machining groove 134 of a pocket shape can be formed. Therefore, the machining process can be changed in accordance with a desired machining shape.

Orbital milling may be a process that the spindle 150 rotates about the main axis thereof and performs a circular movement. When orbital milling is performed, a machined hole 134 having a relatively larger diameter than that of the drilling process can be formed.

In an embodiment of the present invention, a carbon fiber reinforced plastic machining device using CAM may include CAM controlling for each machining target and each machining process, a machining device which performs a drilling process, a milling process, or an orbital milling process in accordance with the control of the CAM, and a controller which performs a machining process for each machining target in relation to individual machining target.

In order to perform the machining process described above, the spindle 150 as illustrated in FIG. 1 and a controller (not illustrated) sending a control signal to the spindle 150 may be included. The machining device with respect to the carbon fiber reinforced plastic stack can perform a machining process on bonding substance of a different kind in accordance with the instruction of the controller. A carbon fiber reinforced plastic stack may include bonding substance of a different kind.

The machining process described above may include a rotational movement and a linear movement. However, the machining device with respect to a carbon fiber reinforced plastic stack according to the embodiment of the present invention includes a program capable of controlling the feeding speed and the rotational speed, and thus the machining device can smoothly perform machining processes on the boundary portion, the stack inlet portion, and the stack outlet portion as described above.

The machining device with respect to carbon fiber reinforced plastics using CAM described above can be applied to a stack-shaped composite material machining method using CAM. A carbon fiber reinforced composite material machining method using CAM allows CAM to be set to include a step s110 of setting a machining route suitable for characteristics of the carbon fiber reinforced plastic composite material machining described above and a step s120 of setting a machining condition suitable for the machining route described above and can perform machining carbon fiber reinforced composite materials based on the set CAM information.

Machining characteristics in the carbon fiber reinforced composite material machining device of the present invention may reflect the characteristics of the stack structure including the stack inlet portion, the stack outlet portion, and the boundary portion and the machining process. In addition, the machining characteristics may reflect the characteristics of the machining inlet portion, the machining outlet portion, and the body portion as described above.

The machining process described above may be a process including milling, drilling, or orbital milling in accordance with the machining route. When such machining process is designed, designing is performed with reflecting the material properties of the first workpiece 102 and the second workpiece 104, and a cutting process or the like can be performed with reflecting this.

Reflecting such processes, embedded software may be embedded in the carbon fiber reinforced composite material machining device.

The embedded software may be a program including processing conditions reflecting material characteristics and processing conditions reflecting the machining target, and further, a spindle machining the carbon fiber reinforced composite material based on the embedded software and a controller controlling the movement of the spindle described above may be included.

The processing conditions reflecting the material characteristics may be conditions reflecting the characteristics of carbon fiber reinforced plastics classified according to the machining targets and conditions reflecting the characteristics of epoxy as the material of the boundary portion. In this case, needless to say, the processing condition can be optimized by adjusting the machining grade. The processing condition in relation to the machining grade may include the feeding speed control and rotational speed control of the spindle 150.

The description of the present invention explained above is exemplary. Those skilled in the art to which the present invention pertain will be able to understand that it is possible to easily deform the embodiment in other specific forms without changing the technical spirit or essential characteristics of the present invention. Therefore, the embodiments described above should be understood that the embodiments are exemplary and do not limit the present invention in all aspect. For example, each component explained in a single shape can be realized in a divided shape, and also the components explained in a divided shape can be realized in a joined shape.

The scope of the present invention is shown by the claims described below. In addition, the meaning and scope of the claims and all changes or various forms derived from the equivalent concepts thereof should be construed as being included within the scope of the present invention.

What is claimed is:

1. A computer-aided carbon fiber reinforced plastic machining method using a computer-aided machine, comprising:
   processing a stack inlet portion and a stack outlet portion of a machining target at a first rotational speed and a first feeding speed of a spindle, wherein the machining target has a stack structure including layers;
   processing a body portion of the machining target at a second rotational speed and a second feeding speed of the spindle; and
   processing a boundary portion of the machining target at the first rotational speed and the first feeding speed of the spindle,
   wherein the stack inlet portion is an edge portion of the machining target at which the spindle starts processing,
   the body portion is an internal portion of the machining target,
   the boundary portion is a portion between a first layer and a second layer of the stack structure of the machining target, and
   the stack outlet portion is an edge portion of the machining target at which the spindle finishes processing, and
   wherein the first rotational speed is greater than the second rotational speed and the first feeding speed is lower than the second feeding speed.

2. The method of claim 1, wherein the machining target comprises carbon fiber reinforced plastics, metals, or binding resins.

3. The method of claim 1, wherein the processing of the stack inlet portion and the stack outlet portion is a drilling, and the processing of the body portion is a milling or orbital milling.

4. A computer-aided carbon fiber reinforced plastic machining device, comprising:
   embedded software configured to control machining process;
   a machining device configured to perform the machining process by at least one of a drilling process, a milling process, and an orbital milling process using a spindle; and
   a controller embedding the embedded software therein and configured to control the machine device,
   wherein the embedded software processes:
      a stack inlet portion and a stack outlet portion of a machining target at a first rotational speed and a first feeding speed of the machining device, wherein the machining target has a stack structure including layers;
      a body portion of the machining target at a second rotational speed and a second feeding speed of the machining device; and
      a boundary portion of the machining target at the first rotational speed and the first feeding speed of the machining device,
   wherein the stack inlet portion is an edge portion of the machining target at which the machining device starts machining,
   the body portion is an internal portion of the machining target,
   the boundary portion is a portion between a first layer and a second layer of the stack structure of the machining target, and
   the stack outlet portion is an edge portion of the machining target at which the machining device finishes machining, and
   wherein the first rotational speed is greater than the second rotational speed and the first feeding speed is lower than the second feeding speed.

* * * * *